United States Patent
Lindquist et al.

(10) Patent No.: US 8,150,944 B2
(45) Date of Patent: Apr. 3, 2012

(54) ELECTRONIC APPARATUS WITH SERVER DEVICE FOR MANAGING SETTING DATA

(75) Inventors: Tobias Lindquist, Sundbyberg (SE); Peter Van Sebille, Manchester (GB)

(73) Assignee: Sony Ericsson Mobile Communications AB, Lund (SE)

( * ) Notice: Subject to any disclaimer, the term of this patent is extended or adjusted under 35 U.S.C. 154(b) by 922 days.

(21) Appl. No.: 11/240,211

(22) Filed: Sep. 30, 2005

(65) Prior Publication Data

US 2007/0076227 A1   Apr. 5, 2007

(51) Int. Cl.
*G06F 15/16* (2006.01)
(52) U.S. Cl. .......................... 709/219; 709/217; 709/203
(58) Field of Classification Search .......... 709/217–219; 370/254–258
See application file for complete search history.

(56) References Cited

U.S. PATENT DOCUMENTS

| 6,029,196 | A | 2/2000 | Lenz |
| 6,480,883 | B1 * | 11/2002 | Tsutsumitake ............... 709/203 |
| 7,194,503 | B2 * | 3/2007 | Shell et al. .................... 709/202 |
| 7,603,447 | B2 * | 10/2009 | Hodgson ....................... 709/221 |
| 2002/0124092 | A1 | 9/2002 | Urien |
| 2006/0085517 | A1 * | 4/2006 | Kaurila ......................... 709/217 |

FOREIGN PATENT DOCUMENTS

EP   1 426 865 A2   6/2004

* cited by examiner

*Primary Examiner* — Ian N Moore
*Assistant Examiner* — Afshawn Towfighi
(74) *Attorney, Agent, or Firm* — Myers Bigel Sibley & Sajovec, P.A.

(57) ABSTRACT

An electronic apparatus and a method for managing access to data for a setting. The electronic apparatus includes a server device and at least one client device that is adapted to interact with the server device to access data for a setting. The data is stored in a memory device. The server device includes at least one interface module that is adapted to manage access to data for a specific setting.

20 Claims, 3 Drawing Sheets

ELECTRONIC APPARATUS WITH SERVER DEVICE FOR MANAGING SETTING DATA

FIELD OF THE INVENTION

The present invention relates to an electronic apparatus that includes a server device and at least one client device. The server device is adapted to manage access to data for a specific setting, and is responsive to the client device. The present invention also relates to methods for managing access to data for settings of the electronic device.

BACKGROUND

In an electronic apparatus, such as a mobile terminal, settings may be provided, for which data is required. A plurality of applications in the electronic apparatus may require access to the data for the settings. For example, an image may in a first application e.g. be data for a wallpaper setting of a display. In a second application the same image may be data for a setting of a phonebook, such as a picture setting of a phonebook entry. The image may be stored at a single location, such as a flash memory. Each of the first and second applications need to manage and keep track of the storage location of the image to be able to access it.

Furthermore, the electronic apparatus may include a plurality of storage locations, e.g. a SIM (Subscriber Identity Module), a Smart card, and/or a cache memory in addition to the flash memory. Settings may be stored at each of the storage locations. For each of the storage locations, different rules and mechanisms may apply for accessing the stored data. Furthermore, each storage location may have multiple rules and mechanisms for storing data and for accessing stored data. Thus, each application that needs access to data stored at a single and/or different storage locations may need to manage multiple rules and mechanisms for managing storage of data. The more applications, storage locations and/or different rules and access mechanisms per storage locations that are implemented, the more complex the management of the data for settings will be.

Furthermore, data for a specific setting may be stored in a remote database accessible through a network. This may make the situation even more complex, as each application that requires access to the data has to be able to communicate, at least indirectly, with the remote database.

To have access to the remote database, and for other communication requirements, the electronic apparatus may include a communication platform, which implements all functions for communicating with the network. The functions of the communication platform may be invisible to a user of the electronic apparatus. The electronic apparatus may also include an operational platform for implementing applications visible to the user. Each of the platforms may be connected to one or several storage locations, wherein data for settings may be stored. The communication platform and the operational platform may be interconnected by e.g. a data channel and a control channel. Communication between the operational platform and the communication platform may be performed according to predetermined rules, provided by e.g. protocols, which may be relatively complex.

Different communication and operational platforms may store settings on different storage locations. For example, in one system, vibrator settings are stored in a memory connected to the communication platform, but in another in a memory connected to the operational platform. Thus, when a manufacturer is changing e.g. a communication platform, the storage location of settings may be changed. Consequently, it may be necessary to update applications on the operational platform to make sure that they are referring to the correct storage location and apply the correct rules and mechanisms for managing the settings data.

One or several applications implemented in the operational platform may require access to data for a setting stored in a storage location connected to the communication platform. Similarly, one or several applications implemented in the communication platform may require access to data for a setting stored in a storage location connected to the operational platform. Thus, not only must each application manage the address to the storage location, but also the predetermined rules, according to which the application may communicate with the platform, to which the storage location is connected. Thus, the management of access to data for a setting may be relatively cumbersome. Also, storage requirements of each application may become relatively large. This is a disadvantage, especially in a portable communication apparatus, wherein the storage capacity may be relatively limited.

It is also possible to store data for a specific setting at multiple storage locations. However, this requires that data stored at multiple locations but pertaining to a single setting are synchronized or mirrored to make sure that the data of the setting at both storage locations are uniform.

SUMMARY OF THE INVENTION

According to a first embodiment of the present invention, an electronic apparatus includes a server device and at least one client device. The client device is adapted to interact with the server device to access data for a setting. The data is stored in a memory device. The server device includes at least one interface module that is adapted to manage access to data for a specific setting.

The interface module may be adapted to register the physical storage location of data for said specific setting.

The interface module may be adapted to handle at least one of a request to set data of a setting, get data of a setting, change data of a setting, and handle subscription to at least one change notification.

The interface module may be provided by a software plug-in.

The server device may be responsive to at least one API received from a client device for accessing data for the specific setting.

The server device may be responsive to at least one client device implemented in an operational platform and at least one client device implemented in a communication platform.

The interface module or the server device may be adapted to register a change of data for the specific setting, and notify any client device having a subscription for a notification of the changed setting.

A first memory device may be connected to the operational platform and a second memory device may be connected to the communication platform.

The electronic apparatus may be a portable or handheld mobile radio communication equipment, a mobile radio terminal, a mobile telephone, a pager, a communicator, an electronic organizer, a smartphone or a computer.

According to a second embodiment of the present invention, a method for accessing data for a setting of an electronic device includes receiving in a server device a request for access to data for a specific setting. The request is issued by a client device. The specific setting for which data is requested is identified based on the request. The request is forwarded to an interface module that is responsible for managing access to data for said specific setting.

Access to the data may be managed in accordance with the request type of the request.

The step of managing may include determining a main setting the received request pertains to, and forward data for any sub-setting of the main setting.

The step of managing may include determining whether the request is a set request and, when the request is a set request, accessing the data pertaining to the specific setting by storing data received in the request message and registering the storage location thereof.

The step of managing may include determining whether the request is a get request and, when the request is a get request, accessing the data pertaining to the specific setting by retrieving said data from a memory device and forwarding said data to the client device from which the request message was received.

The step of managing may include determining whether the request is a change notification request and, when the request is a change notification request, accessing the data pertaining to the specific setting by registering that data pertaining to the specific setting is changed, and issuing a change notification including said data to any client device subscribing to a change notification pertaining to the specific setting.

According to a third embodiment of the present invention, a computer program product includes computer program code means for executing the method for accessing data for a setting of an electronic device, when said computer program code means are run by an electronic device having computer capabilities.

According to a fourth embodiment of the present invention, a computer readable medium having stored thereon a computer program product includes computer program code means for executing the method for accessing data for a setting of an electronic device, when said computer program code means are run by an electronic device having computer capabilities.

According to some other embodiments, a computer program product is configured to access data for a setting of an electronic device. The computer program product includes a computer readable storage medium having computer readable program code embodied therein. The computer readable program code includes computer readable program code that is configured to receive at a server device a request for access to data for a specific setting of the electronic device, said request being issued by a client device. It also includes computer readable program code that is configured to identify based on the request the specific setting for which data is requested, and computer readable program code that is configured to forward the request to an interface module that is responsible for managing access to data for said specific setting.

In some further embodiments, the computer program product further includes computer readable program code that is configured to manage access to the data in accordance with a type the request, and computer readable program code that is configured to manage access to the data in accordance with a type the request.

In some further embodiments, the computer readable program code that is configured to manage access to the data in accordance with a type the request may include computer readable program code that is configured to determine a main setting to which the received request pertains and to forward data for any sub-setting of the main setting.

In some further embodiments, the computer readable program code that is configured to manage access to the data in accordance with a type the request may include computer readable program code that is configured to determine whether the request is a set request and, when the request is a set request, to access the data pertaining to the specific setting by storing data received in the request message and registering the storage location thereof.

In some further embodiments, the computer readable program code that is configured to manage access to the data in accordance with a type the request may include computer readable program code that is configured to determine whether the request is a get request and, when the request is a get request, to access the data pertaining to the specific setting by retrieving said data from a memory device and forwarding said data to the client device from which the request message was received.

In some further embodiments, the computer readable program code that is configured to manage access to the data in accordance with a type the request may include computer readable program code that is configured to determine whether the request is a change notification request and, when the request is a change notification request, to access the data pertaining to the specific setting by registering that data pertaining to the specific setting is changed, and issuing a change notification including said data to any client device subscribing to a change notification pertaining to the specific setting.

Further embodiments of the invention are defined in the dependent claims.

DETAILED DESCRIPTION OF EMBODIMENTS OF THE INVENTION

Figure 1:
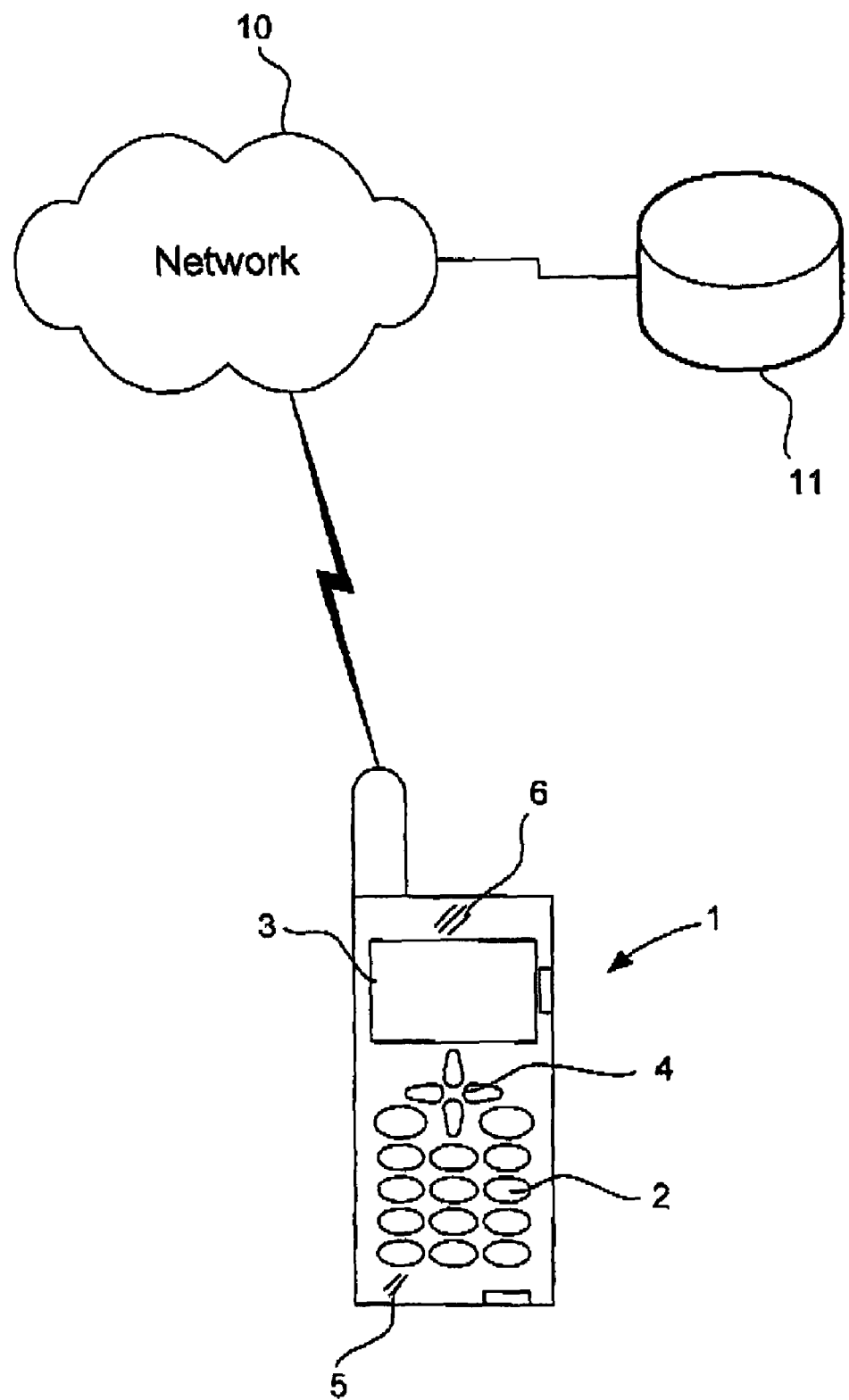
FIG. 1 is schematic view of an electronic apparatus connected to a network according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, electronic apparatus, and computer program products. It is to be understood that each block of the block diagrams and/or operational illustrations, and combinations of blocks in the block diagrams and/or operational illustrations, can be implemented by radio Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 illustrates an electronic apparatus 1. The electronic apparatus 1 may comprise a man-machine interface, such as a keypad 2, a display 3, a joystick 4, a microphone 5 and a loudspeaker 6, though which a user may interact with the electronic apparatus 1.

The electronic apparatus 1 may be a communication apparatus. Thus, the electronic apparatus may be connected to a network 10.

A database 11 may be connected to the network 10 and may be accessible through the network 10. In the database 11, data for settings for the electronic apparatus 1 may be stored.

Settings as used in this description may be any setting that may be altered manually by a user or automatically by the electronic device 1 itself, possibly in response to received information from a remote device. Settings may also be altered by a client device or application, by requests issued on a system bus, or as result of network events, e.g. information has been received from a network. The data may be changed from a first value or content to a second value or content.

The electronic apparatus 1 may comprise various applications for carrying out functions within the electronic apparatus 1. The applications may be provided within an operational platform. Alternatively or additionally, the applications may be provided within a communication platform. The operational platform may comprise systems software run by an application processor, such as a CPU (Central Processing Unit), which may also be referred to as the ACPU (Application CPU). Similarly, the communication platform may comprise both hardware and software for carrying out e.g. communication with the network 2. Thus, also the communication platform may comprise a CPU, which may be referred to as a CCPU, (Communication CPU), for providing various applications. The ACPU and the CCPU may run different operational systems. Also, the communication platform and the operational platform may interact to exchange information.

Figure 2:
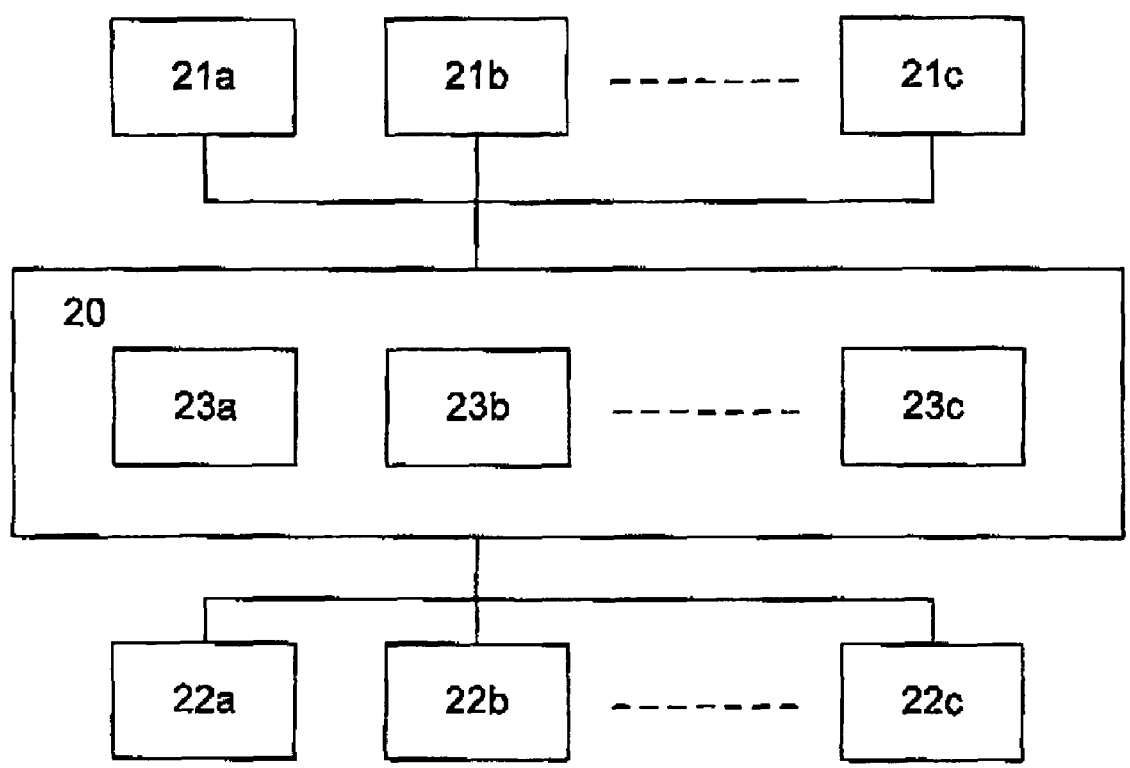
FIG. 2 is a block diagram of one embodiment of the electronic apparatus according to some embodiments of the present invention.

FIG. 2 illustrates a server device 20 of the electronic apparatus 1. The server device 20 may be implemented by software run by a processor, such as the application processor or the communication processor. The server device 20 may be operatively connected or be adapted to interact with at least one client device 21a-21c. Each client device 21a-21c may implement a certain application. Each client device 21a-21c may be implemented with software run by one or several processors. Each client device 21a-21c may be adapted to interact with the server device 20 to access data for settings stored in at least one memory device 22a-22c.

The server device comprises at least one interface module 23a-23c. Each interface module 23a-23c is adapted to manage access to data for a specific setting. The data for a specific setting may be required by more than one client device 21a-21c. Thus, each interface module 23a-23c may manage access to data for a specific setting in response to or in accordance with a request received from a client device 21a-21c requiring access to said data. Each client device 21a-21c does not have to store or have knowledge of e.g. the storage location of the data for a setting, as the server device 20 manages access to the data for the setting. The data for the specific setting may be stored at a single storage location. Centralized management of access to data for a specific setting is an advantage, as the complexity of the system will be reduced when the client devices 21a-21c do not have to have any information for managing the data for the settings. Furthermore, the storage requirements for managing data for settings will be reduced with centralized management. Furthermore, it will only be necessary to store data for a specific setting at a single storage location.

The electronic apparatus 1 may comprise a variety of memory devices 22a-22c for storing data of settings. The data for the specific setting may be stored at a single memory device 22a-22c. However, data for different settings may be stored in different memory devices 22a-22c. Memory device 22a may be a memory of a SIM (Subscriber Identity Module). Memory device 22b may be a flash memory. Memory device 22c may be a memory card. Furthermore, the electronic apparatus 1 may comprise other types of memory devices, such as a cache memory, a ROM (Read Only Memory), a RAM (Random Access Memory), a memory card, a smart card, and/or a hard disk. Data for a setting may also be stored at the database 11 connected device, which is external to the electronic apparatus 1. The external device may e.g. be accessible through an accessory connector or a short-range radio link, such as a Bluetooth® link.

Each interface module 23a-23c may be implemented with a software component or program, such as a plug-in module. The interface module may be adapted to interact with other software programs to provide a certain function. Each plug-in may be adapted to register the physical storage location of data for a specific setting. Also, each interface module 23a-23c may be adapted to keep track of the storage location for the data of the specific setting. The storage location may be altered, which the interface module 23a-23c thus may keep track of. This is an advantage, as the storage location of data for a specific setting may move without the need to update any code in the client device 21a-21c.

Each interface module 23a-23c may be adapted to manage different storage mechanisms and/or rules for a single storage location. For example, on a certain storage location, such as a flash memory, a database with settings and a text file with settings may be stored. The database and the text file may require different rules and methods to access the settings, which the single interface module 23a-23c may manage.

In an alternative embodiment, a single interface module 23a-23c may implement a single storage mechanism of a certain storage location. Thus, for the above-mentioned example, a first interface module may be provided for managing settings accessible through the database of the certain storage location. A second interface module may be provided for managing settings accessible through the text file of the certain storage location.

Interface module 23a may for example be adapted to manage setting A. Interface module 23b may be adapted to manage setting B. Interface module 23c may be adapted to manage setting C. Each specific setting may be owned and managed by a single interface module 23a. This is an advantage, as it may ensure that data for a specific setting is uniform without the need of synchronization of data. Consequently, the reliability of the electronic apparatus 1 increases and the data processing requirements is reduced.

The interaction and communication between the client modules 21a-21c and the interface modules 23a-23c may be provided by program interfaces, which comprise standardized software instructions. Said interaction may be provided by one or several APIs (Application Programming Interface).

A first program interface may provide a GET[Setting X, ClientID] request or request type. [Setting X, ClientID] identifies the specific setting for which data is requested, Setting X in this case, and ClientID is an identifier of the requesting client device 21a-21c, to which the response should be transmitted. A GET request may be issued by a client device 21a-21c, to gain access to data of for the specific setting, and received and processed by the server device 20.

A second program interface may provide a Set[Setting X, Data] request or request type. [Setting X, Data] identifies the specific setting for which data is requested, Setting X in this case, and Data is the data which should be stored for Setting X. A Set request may be issued by a client device 21a-21c, to store and/or alter data for the specific setting, and received by the server device 20.

A third program interface may provide a NotifyOnChange [Setting X, ClientID] request or request typetype. [Setting X] identifies the specific setting for which a notification of any change is requested, setting X in this case, and ClientID is an identifier for identifying the requester to which the change notification should be transmitted. The NotifyOnChange request may be a subscription for a change notification indicating that a change of the data pertaining to Setting X has occurred. A NotifyOnChange request may be issued by a client device 21a-21c, to subscribe to a notification when a setting has been changed, and may be received by the server device 20. In a change notification for the specific setting pertaining to the subscription, any new data for the specific setting may be included.

The Set, Get, and NotifyOnChange requests are only given as examples. The invention is not limited to these examples. Any request to gain access to data for a setting may be managed by the server device 20.

The server device 20 may be adapted to retrieve or identify, from the request issued by the client device 21a-21c, the specific setting to which a received program interface pertains. When the specific setting has been identified, the request may be forwarded to the interface module 23a-23c being responsible for the identified setting. For example, requests Get[Setting A, ClientID X], Set[Setting A, Data], and NotifyOnChange[Setting A, ClientID] may all be forwarded to interface module 23a being responsible for Setting A. Similarly, requests Get[Setting B, ClientID X], Set[Setting B, Data], and NotifyOnChange[Setting B, ClientID] may all be forwarded to interface module 23b being responsible for Setting B; and requests Get[Setting C, ClientID X], Set[Setting C, Data], and NotifyOnChange[Setting C, ClientID] may all be forwarded to interface module 23c being responsible for Setting C.

Each interface module 23a-23c may be adapted to manage storage of data for a certain setting, e.g. the Get request; caching of data for a specific setting; subscription to change notifications, i.e. the NotifyOnChange request; and altering of data for a specific setting, i.e. the Set request.

If several client devices 21a-21c have posted a subscription for a change notification, said notification may be issued substantially simultaneously to all subscribing client devices 21a-21c. This is an advantage, as all client devices 21a-21c will have access to the same data for a setting pertaining to the notification.

The interface modules 23a-23c may be adapted to implement logic and policies for managing the requests. The interface modules 23a-23c may thus comprise instructions, such as protocols, for communication between platforms, with memory devices, networks, and/or external devices. For example, the server device 20 may be implemented by the operational processor, but the storage location for a specific setting may be connected to the communication platform. Then, the interface module 23a-23c may carry out the communication between the platforms. Also, the interface module 23a-23c may manage the storage address for the data of the specific setting it manages access to, subscriber information, etc.

In one embodiment, one or several interface modules 23a-23c may be configured to implement a backup and/or restore function. The backup function may be aware of one or several of the memory devices 22a-22c. However, the backup function need not be aware of the specific settings stored on the memory devices 22a-22c. The backup function may be configured to backup data stored on one or several of the memory devices 22a-22c. For example, only data stored on an internal flash memory device and an external flash memory device may be included in the backup function. The backed up data may be stored on an memory device dedicated for backup data.

A backup operation may e.g. be initiated by an end user. Upon initiation, the server device 20 may be adapted to instruct interface modules 23a-23c to backup all the data for settings they are responsible for and store the data on the memory device dedicated for the backup data. The interface modules 23a-23c not included in the backup function will retrieve all settings on the memory device 22a-22c (similar as they would in response to a Get request), and store the data on the memory device dedicated for the backup data. However, any interface module 23a-23c which manage settings on a memory device 22a-22c included in the backup function need to do nothing in response to the instruction from the server device 20 to backup data.

Similarly a restore operation may be performed. A restore operation may be imitated by an end user, e.g. after a previous backup. The server device 20 may instruct interface modules 23a-23c to restore data for the settings they are responsible for. The interface modules 23a-23c, which manage data for settings stored on memory devices not included in the backup function, may restore the settings from the memory device dedicated for backup data and store the data on the memory device manage data for settings on a memory device 22a-22c which is included in the backup function, need to do nothing in response to restore instructions from the server device 20.

A setting may comprise a main setting. Each main setting may comprise a plurality of sub-settings. Thus, by requesting data pertaining to a main setting, the data of all sub-settings of a main setting may be returned.

As an example, Setting A may pertain to settings for a communication account. The sub-settings for the communication account may e.g. Comprise a username, a password, an IP address, a DNS address, and data compression settings. Data for settings of the communication account may be required by a first client device 21a-21c, such as a communication module. The first client device may require the data of the settings of the communication account to be able to establish a connection to the network 10. The data for sub-settings for the communication account may also be required by a second client device 21a-21c. The second client device 21a-21c may be a user interface module. The user interface module may display the data of the settings of the communication account on the display 3. Thus, each of the first and the second client devices may access the data of the sub-settings of the communication account by only identifying the main-setting in a Get request. The server 20 may respond by including in a response the data pertaining to all sub-settings of the main setting. Thus, the necessary communication between the server device 20 and the client devices 21a-21c may be decreased. This can be useful in all embodiments. However, it may be especially useful if the first and the second client devices 21a-21c are provided in separate platforms. The first client device may be provided in the communication platform, whereas the second client device may be provided in the operational platform.

Other examples of settings that one or several client devices 21a-21c may require access to are settings for connectivity, such as of an Internet account, preferred networks, or short-range communication, such as IR (Infra Red) or Bluetooth®; messaging, such as SMS (Short Message Service) and/or MMS (Multimedia Message Service). Several client devices 21a-21c may also require access to data for general settings such as time/date, language, voice control, phone status, shortcuts, locks, etc. These settings are not exhaustive and are only stated as examples.

Data for settings of e.g. a divert call application, i.e. the phone number to which calls should be diverted, may be stored at the database 11. A client device 21a-21c applying a setting for the divert call could be an interface enabling inputting the phone number by a user. An interface module 23a-23c may administer the storage location of the data pertaining to the setting of the divert call application. Another client device 21a-21c requiring access to the data pertaining to the divert call setting could be a communication interface. In response to an incoming call, the communication interface may request access to the data of the divert call setting to be able to divert the call.

In one embodiment, a first application or client device access data for a setting through an interface module, whereas a second application or client device access the data for the setting directly from the memory device 22a-22c, which may be connected to the platform on which the second application is implemented. For example, data for the setting of "vibrate on incoming call" may be stored on a memory device 22a-22c connected to the communication platform. A client device implemented on the operational platform may implement a user interface for this setting and may use an interface module 23a-23c to access the data for this setting. However, a client device implemented on the communication platform and having the need for the data of the setting of "vibrate on incoming call" may access the data directly from the memory device 22a-22c. This may be an advantage, as communication between the platforms may be reduced when the sever device 20 is implemented on a single platform.

Figure 3:
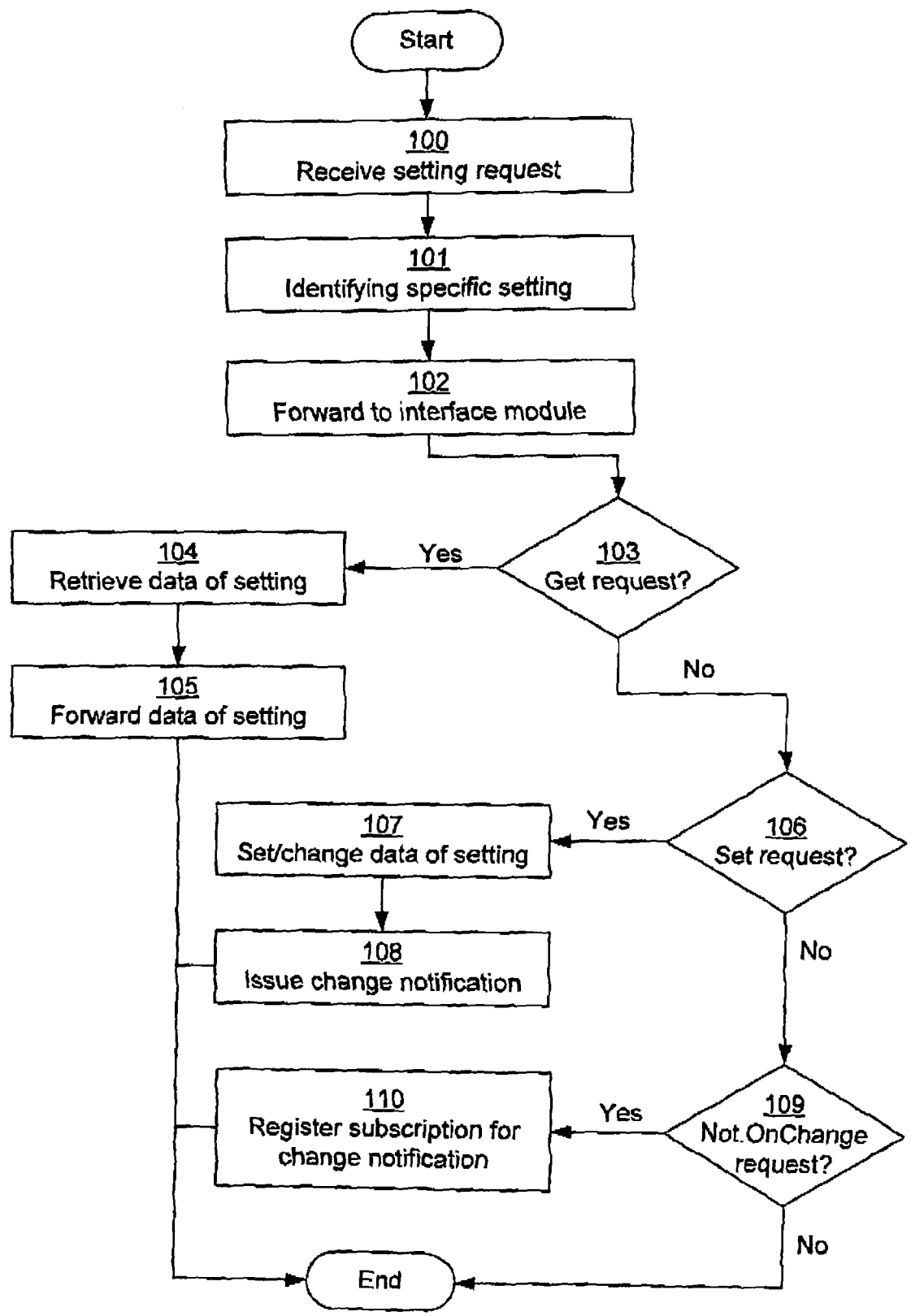
FIG. 3 is a flow-chart of one embodiment of the method for accessing data for at least one setting according to some embodiments of the present invention.

FIG. 3 illustrates one embodiment of a method for managing access to data for settings of the electronic apparatus 1. In a first step 100, a setting request is received by the server device 20 from a client device 21a-21c. In step 101, the specific setting, which the request pertains to and for which data is requested, is identified by the server device 20 based on the request. Then, in step 102 the request is forwarded to the interface module 23a-23c being responsible for managing access to data for the specific setting. In step 103, it is determined whether the request is a Get request. If the answer in step 103 is yes, the procedure proceeds to step 104. In step 104, the data pertaining to the specific setting of the request is retrieved from the memory device 22a-22c, in which it is stored. Thus, the storage location of the data for the specific setting has to be determined. The determination of the storage location is made within the interface module 23a-23c responsible for the specific setting. In step 105, the data for the specific setting retrieved from the memory device 22a-22c is forwarded to the client device 21a-21c from which the request was received. Then, the procedure is ended. If the answer in step 103 is no, the procedure proceeds to step 106. In step 106 it is determined whether the request is a Set request. If the answer in step 106 is yes, the procedure proceeds to step 107. In step 107 the data pertaining to the specific setting is set, i.e. the data is stored in a memory device 22a-22c. The storage location, i.e. the address to the memory device 22a-22c, is registered in or accessible by the interface module 23a-23c being responsible for the specific setting. Alternatively, if data for the specific setting is already stored in a memory device 22a-22c, the stored data may be changed to the data received in the request. Then, the procedure proceeds to step 108. In step 108, it is determined whether the interface module 23a-23c being responsible for the specific setting has any subscription for a change notification registered. If data was changed in step 107 and a subscription for a change notification is registered, a change notification is issued to the subscribing client device 21a-21c. The changed data of the specific setting may also be included in the change notification. Then, the procedure is ended. If the answer in step 106 is no, the procedure proceeds to step 109. In step 109, it is determined whether the request is a NotifyOnChange request. If the answer in step 109 is yes, the procedure proceeds to step 110. In step 110, the subscription of a change notification for the specific setting is registered in the interface module 23a-23c being responsible for the specific setting. Then, the procedure is ended. If the answer in step 108 is no, e.g. if the request is not recognized, the procedure may result in an error and thus be ended.

In some other embodiments, also other types of requests may be processed. This may be done e.g. after step 109. Also, in some other embodiments, not all steps according to the embodiment of FIG. 3 are carried out. For example, it is not necessary to include all of steps 103, 106, and 108, and the steps following a yes of the determinations made therein.

The determination made in step 103 may be made by the server device 20 directly before forwarding the request to the interface module 23a-23c. Alternatively, the server device 20 performs the determination indirectly in one of its interface modules 23a-23c. Also, in another embodiment, a single identifying step is provided, wherein the type of the received request is determined, i.e. whether the received request is a Get, Set, or NotifyOnChange request. Then, the request could be managed according to the steps following the determination steps in the embodiment of FIG. 3.

In one embodiment, data pertaining to a setting may be included in a change notification. However, in another embodiment, the change notification does not include any data of the setting. Instead, the client device having a subscription to the change notification is adapted to issue a Get request to get the latest values of the data of the changed setting in response to a change notification. This may be useful for a) keeping the solution simple, and b) reducing the amount of data being transferred. Assume e.g. that two Set requests for setting A are issued for setting a relatively short after one another, either by a single client device, e.g. client device 21a, or by separate client devices, e.g. client devices 21a and 21b. Also, assume that e.g. client device 21c has subscribed to be notified on changes to data for setting A. It is then possible that client device 21c has not yet been able to process a first change notification for setting A by the time a second notification is received. Therefore, client device 21a may instead be adapted to issue a separate Get request for setting A when it receives a change notification therefore. Then, it can issue the Get request when it is ready to process it. Furthermore, if the second change notification is received before a first Get request is issued in response to the first change notification, it may only be necessary to issue a Get request in response to the second change notification, wherein the data communication will be reduced compared to issuing a Get request also in response top the first change notification.

In still another embodiment, the administration of subscription may be centrally administered by the sever device 20. Thus, also change notifications may be centrally issued by the server device 20. Thus, the server device 20 may make the determinations made in steps 103, 106 and 109.

The server device 20 may be utilized in a wide variety of electronic devices, which have a need to store data for settings at storage locations. The electronic apparatus 1 may e.g. be a portable or handheld mobile radio communication equipment, a mobile radio terminal, a mobile telephone, a pager, a communicator, an electronic organizer, a smartphone or a computer. In the embodiment of FIG. 1, the electronic apparatus 1 is exemplified by a mobile telephone.

The network 10 may be any type of wired or wireless communication network, such as a telecommunication network, a WAN (Wide Area Network) a LAN (Local Area Network), or a WLAN (Wireless Local Area Network).

It may be an advantage of some embodiments of the invention that management of access to data for settings is centralized in the server 20. This eliminates the possibility for race conditions, e.g. that two or more client devices 21a-21c tries to change data of a specific setting simultaneously or that data of a setting is set to an incorrect value. Another advantage may be that clients with different priority do not get the wrong information in a setting due to race conditions. The server device 20 can mitigate any such condition by queuing and arbitration of requests, e.g. for settings and alterations of settings. Furthermore, notification of a change of data of a setting may be issued substantially simultaneously to multiple client devices 21a-21c. Thus, conflicts between client devices 21a-21c may be avoided. Furthermore, if data for a specific setting is only stored at one storage location, mirroring or duplication of data is not necessary, as it is if data for a specific setting is stored at multiple storage locations. Furthermore, backup and restoration of data for settings are simplified as the server device 20 has knowledge of the storage locations of data for all settings. Backup data of data for settings may e.g. be stored in a computer and easily be transferred to the server device 20, which may restore data for settings from the backup data. Also, a master reset may easily be made, wherein all settings are reverted to data for a setting originally defined, which has been set during manufacturing. The originally defined data for a setting may be included in the interface module 23a-23c responsible for the specific setting. Furthermore, with centralized management of access to data for settings, new memory devices may easily be added without adding any new code or instructions in any client device 21a-21c. Also, additional interface modules for additional settings are easily implemented. Also, the server device 20 may be adapted to queue several settings if they are received sufficiently close in time such that they cannot be handled immediately. Therefore, the server device 20 may also be adapted to arbitrate between different queued requests, e.g. if they have different priority.

Some embodiments of the invention may be carried out in a computer program product that is configured in accordance with the methods and functions described herein. Accordingly, some embodiments of the invention may be carried out when the computer program product is loaded and run in a system having computer capabilities, such as a processor. Computer program, software program, program product, or software, as referred to herein means any expression, in any programming language, code or notation, of a set of instructions intended to cause a system having a processing capability to perform a particular function directly or after conversion to another language, code or notation. The computer program product may be stored on a computer readable medium.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A portable communication apparatus comprising:
a server device; and
at least one client device adapted to interact with the server device to access data for a plurality of settings, which data is stored in a memory device;
wherein the server device comprises a plurality of interface modules, each of which comprises a discrete component implementing functionality for managing access to data for a different one of the settings in response to a request received from the client device, wherein each of the interface modules is adapted to respond to receipt of a request by requesting to set data for an associated one of the settings, by getting data for the associated one of the settings, by changing data for the associated one of the settings, and/or by handling subscription to at least one change notification, and a number of the interface modules corresponds to a number of the different settings;
wherein data for a respective one of the plurality of settings is stored only at a single storage location; and
wherein the server device and the at least one client device are disposed within a common housing.

2. The portable communication apparatus according to claim 1, wherein the interface module is adapted to register the physical storage location of data for an associated one of the settings.

3. The portable communication apparatus according to claim 1, wherein the interface modules are provided by a software plug-in.

4. The portable communication apparatus according to claim 1, wherein the server device is responsive to at least one API received from the client device for accessing data for the settings.

5. The portable communication apparatus according to claim 1, wherein the server device is responsive to at least one client device implemented in an operational platform and at least one client device implemented in a communication platform.

6. The portable communication apparatus according to claim 1, wherein the interface modules or the server device is adapted to register a change of data for the associated settings, and notify any client device having a subscription for a notification of the changed setting.

7. The portable communication apparatus according to claim 1, wherein a first memory device is connected to an operational platform and a second memory device is connected to a communication platform.

8. The portable communication apparatus according to claim 1, further comprising a portable mobile radio communication equipment, a mobile radio terminal, a mobile telephone, a pager, a communicator, an electronic organizer, a smartphone, and/or a computer.

9. A method for accessing data for settings of a portable communication apparatus, the method comprising:
   receiving in a server device a request from a client device for access to data for one of the settings of the portable communication apparatus, wherein the server device and the client device are disposed within a common housing;
   identifying based on the request the specific setting for which data is requested; and
   forwarding the request to a specific interface module among a plurality of interface modules, each of which comprises a discrete component implementing functionality for managing access to data for said specific setting, wherein each of the interface modules manages access to data for a different one of the settings, wherein each of the interface module separately responds to receipt of a request by requesting to set data for an associated one of the settings, by getting data for the associated one of the settings, by changing data of the associated one of the settings, and/or by handling subscription to at least one change notification, and a number of the interface modules corresponds to a number of the different settings, and wherein data for a respective one of the settings of the portable communication apparatus is stored only at a single storage location.

10. The method according to claim 9, further comprising managing access to the data in accordance with a type of request.

11. The method according to claim 10, wherein the step of managing comprises determining a main setting to which the received request pertains, and forwarding data for any sub-setting of the main setting.

12. The method according to claim 10, wherein the step of managing comprises determining whether the request is a set request and, when the request is a set request, accessing the data pertaining to the specific setting by storing data received in the request message and registering the storage location thereof in the associated interface module.

13. The method according to claim 10, wherein the step of managing comprises determining whether the request is a get request and, when the request is a get request, accessing the data pertaining to the specific setting by retrieving said data from a memory device and forwarding said data to the client device from which the request message was received.

14. The method according to claim 10, wherein the step of managing comprises determining whether the request is a change notification request and, when the request is a change notification request, accessing the data pertaining to the specific setting by registering that data pertaining to the specific setting is changed, and issuing a change notification including said data to any client device subscribing to a change notification pertaining to the specific setting.

15. A computer program product configured to access data for settings of a portable communication apparatus, the computer program product comprising:
   a non-transitory computer readable storage medium having computer readable program code embodied therein, the computer readable program code comprising:
   computer readable program code that is configured to receive at a server device a request from a client device for access to data for one of the settings of the portable communication apparatus, wherein the server device and the client device are disposed within a common housing;
   computer readable program code that is configured to identify based on the request the specific setting for which data is requested;
   computer readable program code that provides a plurality of interface modules, each of which comprises a discrete component implementing functionality for managing access to data for a different one of the settings, wherein a number of the interface modules corresponds to a number of the different settings; and
   computer readable program code that is configured to forward the request to a specific interface module among the plurality of interface modules that is responsible for managing access to data for said specific setting, wherein each of the interface modules separately responds to receipt of a request by requesting to set data for an associated one of the settings, by getting data for the associated one of the settings, by changing data for the associated one of the settings, and/or by handling subscription to at least one change notification;
   wherein data for a respective one of the settings of the portable communication apparatus is stored only at a single storage location.

16. The computer program product of claim 15, further comprising:
   computer readable program code that is configured to manage access to the data in accordance with a type of request.

17. The computer program product of claim 16, wherein the computer readable program code that is configured to manage access to the data in accordance with a type the request comprises computer readable program code that is configured to determine a main setting to which the received request pertains and to forward data for any sub-setting of the main setting.

18. The computer program product of claim 16, wherein the computer readable program code that is configured to manage access to the data in accordance with a type the request comprises computer readable program code that is configured to determine whether the request is a set request and, when the request is a set request, to access the data pertaining to the specific setting by storing data received in the request message and registering the storage location thereof.

19. The computer program product of claim 16, wherein the computer readable program code that is configured to manage access to the data in accordance with a type the request comprises computer readable program code that is configured to determine whether the request is a get request and, when the request is a get request, to access the data pertaining to the specific setting by retrieving said data from a memory device and forwarding said data to the client device from which the request message was received.

20. The computer program product of claim 16, wherein the computer readable program code that is configured to manage access to the data in accordance with a type the request comprises computer readable program code that is configured to determine whether the request is a change notification request and, when the request is a change notification request, to access the data pertaining to the specific setting by registering that data pertaining to the specific setting is changed, and issuing a change notification including said data to any client device subscribing to a change notification pertaining to the specific setting.

* * * * *

UNITED STATES PATENT AND TRADEMARK OFFICE
CERTIFICATE OF CORRECTION

PATENT NO. : 8,150,944 B2  Page 1 of 1
APPLICATION NO. : 11/240211
DATED : April 3, 2012
INVENTOR(S) : Lindquist et al.

It is certified that error appears in the above-identified patent and that said Letters Patent is hereby corrected as shown below:

In the Patent:

Column 6, Lines 46-48: Please replace "and/or a hard disk. Data for a setting may also be stored at the database 11 connected device, which is external to the electronic apparatus 1."
to read -- and/or a hard disk. Data for a setting may also be stored at the database 11 connected to the network 2. Also, data for a setting may be stored in a memory device of a device, which is external to the electronic apparatus 1. --

Column 8, Lines 65-67: Please replace "device manage data for settings on a memory device 22a-22c which is included in the backup function, need to do nothing in response to restore instructions from the server device 20."
to read -- device 22a-22c where the settings need to be stored. Interface modules 23a-23c, which manage data for settings on a memory device 22a-22c which is included in the backup function, need to do nothing in response to restore instructions from the server device 20. --

Signed and Sealed this
Eighteenth Day of September, 2012

David J. Kappos
*Director of the United States Patent and Trademark Office*